United States Patent
Pyo

(10) Patent No.: US 11,403,038 B2
(45) Date of Patent: Aug. 2, 2022

(54) CONTROLLER, A MEMORY SYSTEM INCLUDING THE CONTROLLER, AND METHOD OF OPERATING THE CONTROLLER

(71) Applicant: SK hynix Inc., Icheon-si (KR)

(72) Inventor: Young Taek Pyo, Icheon-si Gyeonggi-do (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 99 days.

(21) Appl. No.: 16/919,804

(22) Filed: Jul. 2, 2020

(65) Prior Publication Data

US 2021/0132864 A1    May 6, 2021

(30) Foreign Application Priority Data

Nov. 5, 2019    (KR) .......................... 10-2019-0140438

(51) Int. Cl.
   *G06F 3/06*    (2006.01)

(52) U.S. Cl.
   CPC ............ *G06F 3/0659* (2013.01); *G06F 3/064* (2013.01); *G06F 3/0619* (2013.01); *G06F 3/0653* (2013.01); *G06F 3/0656* (2013.01); *G06F 3/0679* (2013.01)

(58) Field of Classification Search
   CPC ...... G06F 3/0659; G06F 3/0619; G06F 3/064; G06F 3/0653; G06F 3/0656; G06F 3/0679; G06F 3/0616; G06F 11/1608; G06F 11/167; G06F 11/1612
   See application file for complete search history.

(56) References Cited

U.S. PATENT DOCUMENTS

| | | | |
|---|---|---|---|
| 2001/0021958 A1* | 9/2001 | Zink | ................ G11C 16/10 711/103 |
| 2010/0115325 A1* | 5/2010 | Lin | ................ G06F 11/1068 714/2 |
| 2014/0068161 A1* | 3/2014 | Yi | ................ G06F 12/0246 711/103 |

FOREIGN PATENT DOCUMENTS

| KR | 1020170098024 A | 8/2017 |
|---|---|---|
| KR | 1020180032911 A | 4/2018 |

OTHER PUBLICATIONS

Micron, Technical Note TN-29-19 NAND Flash 101; Retrieved from the Internet, Retrieved on Nov. 30, 2021 <url: https://user.eng.umd.edu/~blj/CS-590.26/micron-tn2919.pdf> (Year: 2010).*

* cited by examiner

*Primary Examiner* — David Yi
*Assistant Examiner* — Dustin B. Fulford
(74) *Attorney, Agent, or Firm* — William Park & Associates Ltd.

(57) ABSTRACT

Embodiments include a controller, a memory system including the controller, and a method of operating the controller. The controller includes a buffer memory configured to store original data. The controller also includes a central processing unit configured to generate a first command for transmitting the original data to a memory device, generate a second command for receiving data from the memory device, and store the data in the buffer memory. The controller further includes a data comparator configured to compare the data stored in the buffer memory with the original data. The central processing unit is further configured to determine whether the memory device is defective according to a comparison result of the data comparator.

19 Claims, 11 Drawing Sheets

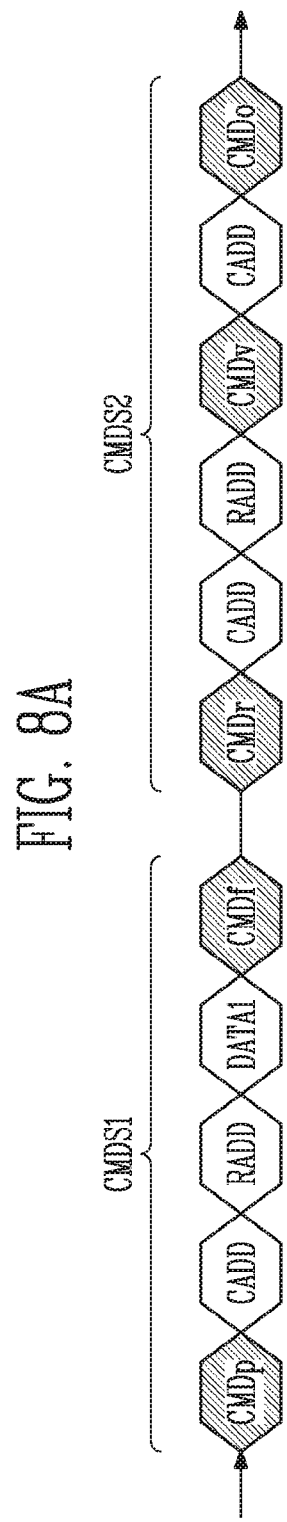

CONTROLLER, A MEMORY SYSTEM INCLUDING THE CONTROLLER, AND METHOD OF OPERATING THE CONTROLLER

CROSS-REFERENCE TO RELATED APPLICATION

The present application claims priority under 35 U.S.C. § 119(a) to Korean patent application number 10-2019-0140438, filed on Nov. 5, 2019, in the Korean Intellectual Property Office, the entire disclosure of which is incorporated herein by reference.

BACKGROUND

1. Technical Field

The present disclosure relates to a controller, a memory system including the controller, and a method of operating the controller, and more particularly, to a controller capable of detecting a progressive error that may occur in a memory device, a memory system including the same, and a method of operating the controller.

2. Related Art

A memory system may include a memory device capable of storing data and a controller capable of controlling the memory device.

The memory device may include a memory cell array that stores data, and may include peripheral circuits for programming data to memory cells included in the memory cell array, or reading or erasing the programmed data. The memory device may be classified as a volatile memory device in which stored data is lost when a supply of power is cut off, or a nonvolatile memory device in which stored data is maintained even when power is no longer supplied.

The controller may control data communication between a host and the memory device. For example, the controller may control the memory device according to a request from the host. In addition, the controller may perform a background operation to improve performance of the memory system although there is not a request from the host. For example, the controller may perform garbage collection or read reclaim.

Garbage collection means a function of copying valid data stored in victim blocks to a target block and increasing the number of free blocks by erasing the victim blocks, when the number of free blocks is less than a reference number. Read reclaim means a technique of copying data to another block in order to prevent read disturb of a corresponding block when a read count value in which a read operation is performed is greater than a reference value.

The host may communicate with the memory device through the controller by using an interface protocol such as peripheral component interconnect-express (PCI-E), advanced technology attachment (ATA), serial ATA (SATA), parallel ATA (PATA), or serial attached SCSI (SAS). The interface protocol between the host and the memory system is not limited to the above-indicated examples, and various interfaces such as universal serial bus (USB), multi-media card (MMC), enhanced small disk interface (ESDI), or integrated drive electronics (IDE) may be included.

SUMMARY

A controller according to an embodiment of the present disclosure includes a buffer memory configured to store original data. The controller also includes a central processing unit configured to generate a first command for transmitting the original data to a memory device, generate a second command for receiving data from the memory device, and store the data in the buffer memory. The controller further includes a data comparator configured to compare the data stored in the buffer memory with the original data. The central processing unit is further configured to determine whether the memory device is defective according to a comparison result of the data comparator.

A memory system according to an embodiment of the present disclosure includes a memory device including page buffers that store data. The memory system further includes a controller configured to input first data to the page buffers of the memory device and detect a defect of the memory device according to a result of comparing second data received from the memory device with each other.

A method of operating a controller includes storing first data in a first register, inputting the first data to a memory device, receiving second data from the memory device, and storing the second data in a second register. The method also includes comparing the first and second data, which are stored in the first and second registers, respectively, with each other. The method further includes detecting a defect of the memory device according to a result of the comparison.

BRIEF DESCRIPTION OF THE DRAWINGS

FIGS. 8A and 8B are diagrams of a command set transmitted from the controller to the memory device.

DETAILED DESCRIPTION

Figure 1:
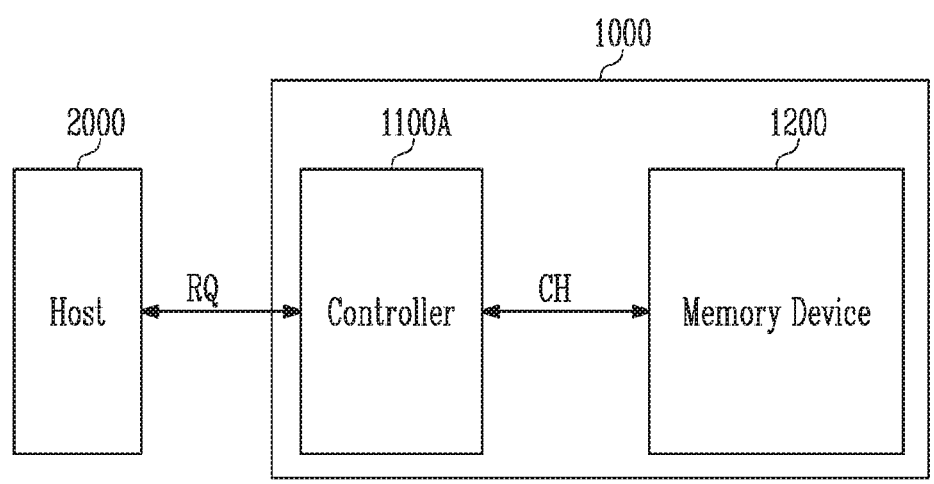
FIG. 1 is a diagram of a memory system according to an embodiment of the present disclosure.

FIG. 1 is a diagram for describing a memory system 1000 according to an embodiment of the present disclosure.

Referring to FIG. 1, the memory system 1000 may include a controller 1100A and a memory device 1200.

The controller 1100A generates a command according to a request RQ of a host 2000, and transmits a command set including the command to the memory device 1200 through a channel CH. In addition, the controller 1100A may receive data from the memory device 1200 through the channel CH, and compare the received data with original data to detect an error or defect of the memory device 1200.

The controller 1100A shown in FIG. 1 may temporarily store data to be transmitted to the host 2000 or the memory device 1200, and may temporarily store data received from the host 2000 or the memory device 1200.

The data temporarily stored in the controller 1100A may be erased when the data is normally transmitted to the host 2000 or the memory device 1200 or when the memory device 1200 completes an operation using the data.

In addition, the controller 1100A may perform a background operation capable of managing the memory device 1200 without the request RQ of the host 2000. The background operation is performed to improve performance of the memory device 1200, and may include, for example, garbage collection, wear leveling, and the like. In addition, various operations such as an operation of managing data and an operation of managing an address may be performed in the background operation.

The memory device 1200 may be implemented as a volatile memory device in which stored data is lost when power supply is cut off, or a non-volatile memory device in which stored data is maintained even though power supply is cut off. In the following embodiment, the memory device 1200 implemented as the non-volatile memory device will be described as an example, but the present embodiment is not limited thereto.

Figure 2:
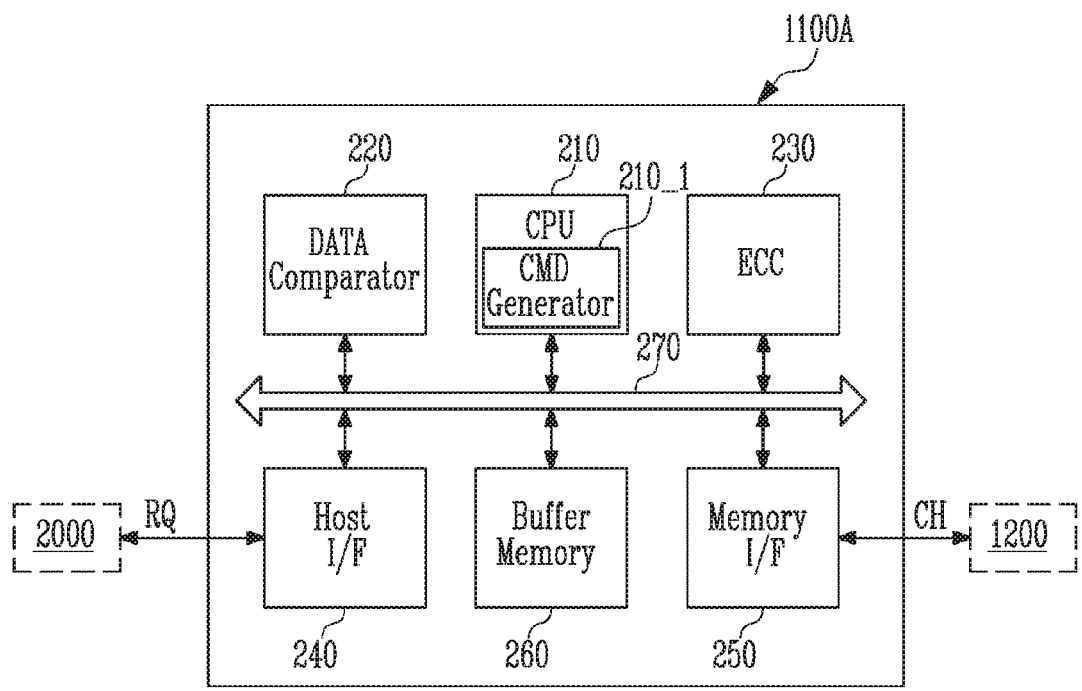
FIG. 2 is a diagram of a controller shown in FIG. 1.

FIG. 2 is a diagram for specifically describing the controller 1100A shown in FIG. 1.

Referring to FIG. 2, the controller 1100A may include a central processing unit (CPU) 210, a data comparator 220, and an error correction component (ECC) 230, a host interface (host I/F) 240, a memory interface (memory I/F) 250, and a buffer memory 260 which communicate with each other through a bus 270.

The central processing unit 210 may control devices included in the controller 1100A according to the request of the host 2000 to selectively transmit a command, an address, and data to the memory device 1200. In addition, when there is no request from the host 2000, the central processing unit 210 may perform the background operation to improve the performance of the memory system 1000 of FIG. 1.

When the central processing unit 210 receives the request RQ of the host 2000 of FIG. 1 or performs the background operation, the central processing unit 210 may generate the command for controlling the memory device 1200 and may include a command generator (CMD generator) 210_1 for generating and outputting the command. For example, the command generator 210_1 may generate and output a program command when receiving a request RQ for a program from the host 2000, and may generate and output a read or erase command when receiving a request RQ for reading or erasing. During the background operation, the command generator 210_1 may generate and output the program, read, or erase command according to an internal request of the central processing unit 210.

The data comparator 220 may compare data stored in the buffer memory 260 with each other and output a comparison result. For example, the data comparator 220 may compare whether first data and second data stored in the buffer memory 260 are identical to each other, and then output a comparison result signal.

The error correction component 230 may detect and correct an error of data during a program or read operation. For example, the error correction component 230 may encode data received from the host 2000 during the program operation, and decode data received from the memory device 1200 during the read operation. During encoding and decoding, the error correction component 230 may use a low density parity check (LDPC) code, and may perform an error correction operation using various types of codes in addition to the LDPC code.

The host interface 240 may exchange the request, the address, the data, and the like between the controller 1100A and the host 2000. For example, the host interface 240 may include various interfaces such as peripheral component interconnect-express (PCI-E), advanced technology attachment (ATA), serial ATA (SATA), parallel ATA (PATA), serial attached SCSI (SAS), a non-volatile memory express (NVMe), universal serial bus (USB), multi-media card (MMC), enhanced small disk interface (ESDI), or integrated drive electronics (IDE).

The memory interface 250 may exchange the command, the address, the data, and the like between the controller 1100A and the memory device 1200. For example, the memory interface 250 may transmit the command and the address output from the central processing unit 210 and the data output from the buffer memory 260 to the memory device 1200 through the channel CH, and may transmit the data received from the memory device 1200 to the buffer memory 260.

The buffer memory 260 may temporarily store various pieces of data necessary for an operation of the controller 1100A, or may temporarily store data during the program or read operation. For example, the buffer memory 260 may be implemented as a DRAM, an SRAM, or a non-volatile memory. In addition, the buffer memory 260 may store address mapping information necessary for an operation of the memory system 1000, and may store addresses of bad blocks. Information stored in the buffer memory 260 may be updated or output under control of the central processing unit 210.

Figure 3:
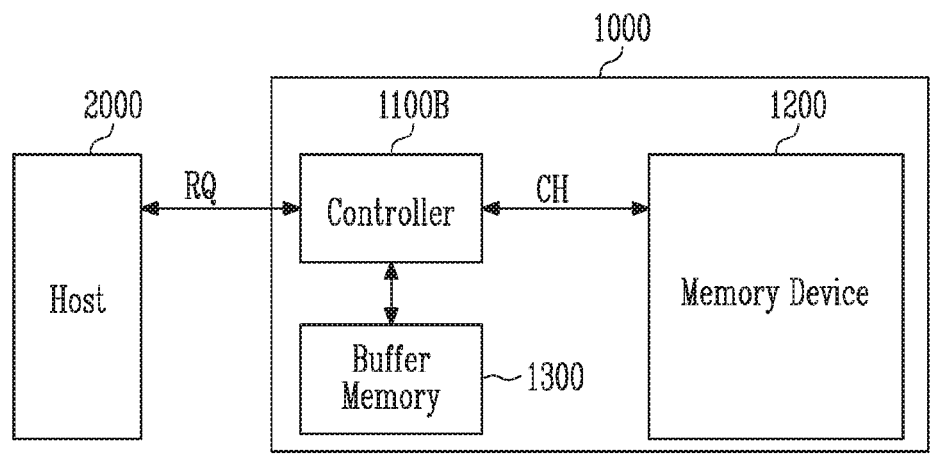
FIG. 3 is a diagram of a memory system according to another embodiment.

FIG. 3 is a diagram for describing the memory system 1000 according to another embodiment.

Referring to FIG. 3, differently from FIG. 1 and FIG. 2, the memory system 1000 may include a buffer memory 1300 disposed outside a controller 1100B. That is, the memory system 1000 shown in FIG. 3 may include the controller 1100B, the memory device 1200, and a buffer memory 1300.

The controller 1100B to which the memory device 1200 and the buffer memory 1300 are connected will be described in detail as follows.

Figure 4:
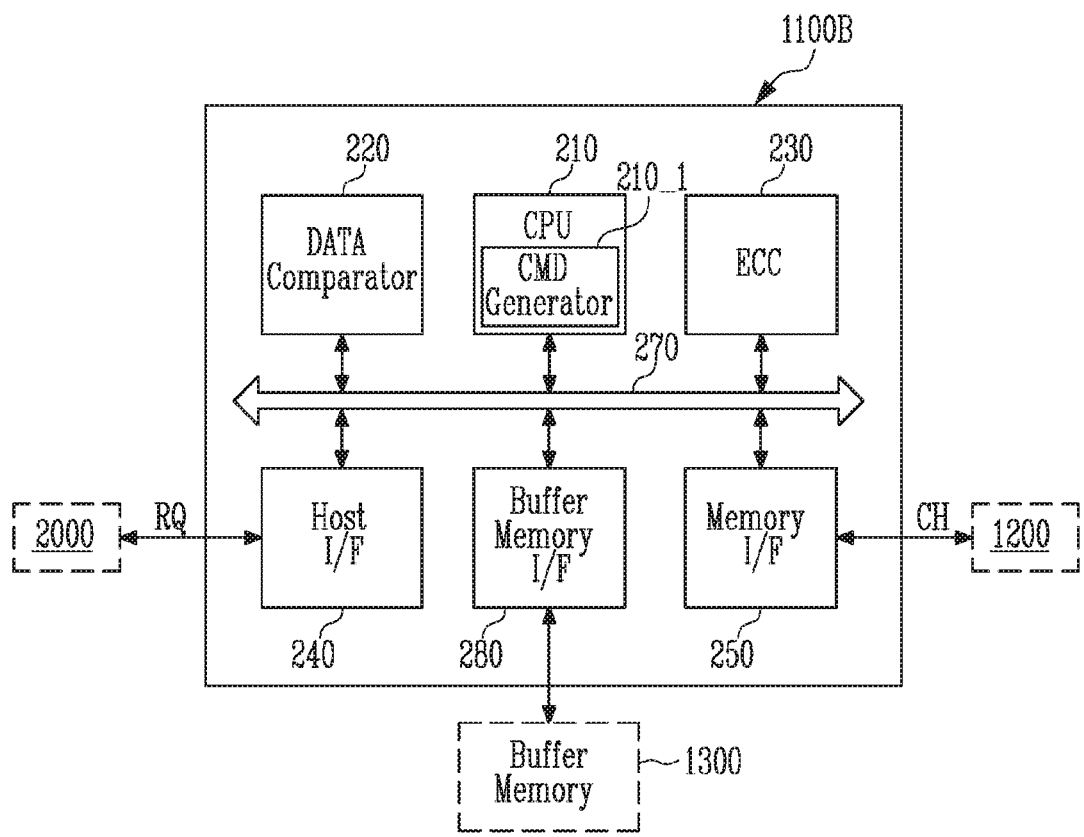
FIG. 4 is a diagram of a controller shown in FIG. 3.

FIG. 4 is a diagram for specifically describing the controller 1100B shown in FIG. 3.

Referring to FIG. 4, the controller 1100B may include the central processing unit 210, the data comparator 220, the error correction component 230, the host interface 240, the memory interface 250, and a buffer memory interface 280. In FIG. 2, the buffer memory 260 is included in the controller 1100A. However, in FIG. 4, because the buffer memory 1300 is connected to the outside of the controller 1100B, the controller 1100B may include the buffer interface 280 for communicating with the buffer memory 1300.

The remaining configurations except for the buffer memory interface 280 is the same as those of FIG. 2, and thus repetitive description is omitted.

The buffer memory 1300 may have the same function as the buffer memory 260 described with reference to FIG. 2. For example, the buffer memory 1300 may temporarily store various pieces of data necessary for an operation of the controller 1100B or temporarily store data during the program or read operation. For example, the buffer memory 1300 may be implemented as a DRAM, an SRAM, or a non-volatile memory. In addition, the buffer memory 1300 may store address mapping information necessary for the operation of the memory system 1000, and may store the addresses of the bad blocks. Information stored in the buffer memory 1300 may be updated or output under the control of the central processing unit 210.

Figure 5:
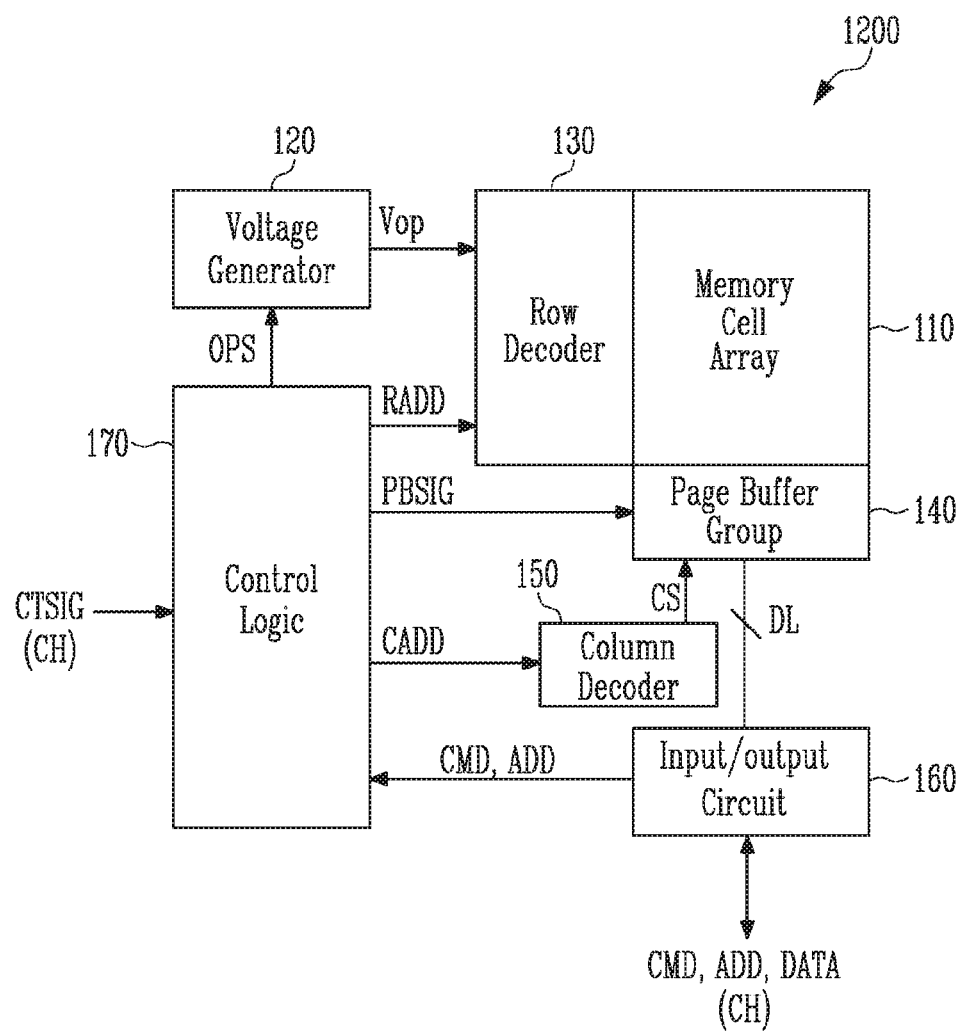
FIG. 5 is a diagram of a memory device.

FIG. 5 is a diagram for specifically describing the memory device 1200.

Referring to FIG. 5, the memory device 1200 may include a memory cell array 110 in which data is stored and peripheral circuits 120 to 170 performing the program, read, or erase operation.

The memory cell array 110 may include a plurality of memory blocks in which the data is stored. Each of the memory blocks includes a plurality of memory cells, and the memory cells may be implemented in a two-dimensional structure arranged parallel to a substrate or in a three-dimensional structure stacked in a direction perpendicular to the substrate.

The peripheral circuits 120 to 170 may include a voltage generator 120, a row decoder 130, a page buffer group 140, a column decoder 150, an input/output circuit 160, and control logic 170.

The voltage generator 120 may generate and output operation voltages Vop necessary for various operations in response to an operation signal OPS. For example, the voltage generator 120 may generate and output the operation voltages Vop such as a program voltage, a verify voltage, a read voltage, a pass voltage, and an erase voltage.

The row decoder 130 may select one memory block among the memory blocks included in the memory cell array 110 according to a row address RADD, and may transmit the operation voltage Vop through local lines connected to the selected memory block.

The page buffer group 140 may include a plurality of page buffers connected to bit lines, and may temporarily store data during the program or read operation in response to a page buffer control signal PBSIG. Each of the page buffers may include a plurality of latches for temporarily storing data during program, read, and verify operations.

The column decoder 150 may output column select signals CS for controlling data transmission between the page buffer group 140 and the input/output circuit 160 in response to a column address CADD. For example, the column decoder 150 may sequentially transfer data received from the input/output circuit 160 to the page buffer group 140 through data lines DL during the program operation, or may sequentially transfer data stored in the page buffer group 140 to the input/output circuit 160 during the read operation.

The input/output circuit 160 may be connected to the controller 1100A of FIG. 1 or 1100B of FIG. 3 through input/output lines included in the channel CH, and may input and output the command CMD, the address ADD, and the data DATA through input/output lines. For example, the input/output circuit 160 may transmit the command CMD and the address ADD received from the controller 1100A or 1100B to the control logic 170, and may transmit the data DATA to the page buffer group 140. In addition, the input/output circuit 160 may output the data DATA received from the column decoder 150 to the controller 1100 through the input/output lines during the read operation.

The control logic 170 may output the operation signal OPS and the page buffer control signal PBSIG in response to control signals CTSIG received through the channel CH and the command CMD received through the input/output circuit 160, and may output the row address RADD and the column address CADD in response to the address ADD. The control signals CTSIG received through the channel CH may include a chip enable signal, an address latch enable signal, a write enable signal, and the like. The control logic 170 may distinguish the command CMD and the address ADD received from the input/output circuit 160 according to the control signals CTSIG. The control logic 170 may be implemented as hardware, software, or a combination of hardware and software. For example, the control logic 170 may be a control logic circuit operating in accordance with an algorithm and/or a processor executing control logic code.

Figure 6:
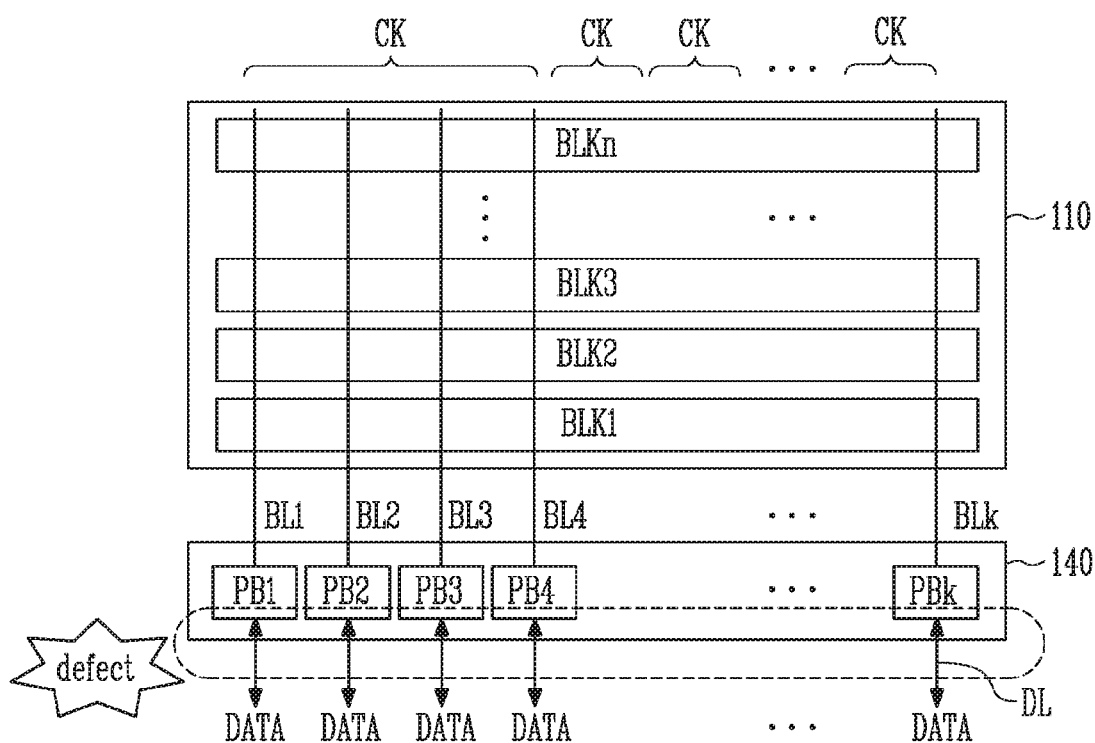
FIG. 6 is a diagram of a page buffer group shown in FIG. 5.

FIG. 6 is a diagram for specifically describing the page buffer group 140 shown in FIG. 5.

Referring to FIG. 6, the page buffer group 140 may include first to k-th page buffers PB1 to PBk connected to first to k-th bit lines BL1 to BLk, respectively. The first to k-th page buffers PB1 to PBk may exchange the data DATA with the input/output circuit 160 of FIG. 5 through the data lines DL.

As a data storage capacity of each of the memory blocks BLK1 to BLKn included in the memory cell array 110 increases, the number of bit lines BL1 to BLK also increases, and thus the number of first to k-th page buffers PB1 to PBk also increases. Therefore, as the number of data lines DL connected to the first to k-th page buffers PB1 to PBk increases, a distance between the data lines DL may decrease. Thus, after manufacturing of the memory device is completed, a defect such as a bridge may occur in the data lines DL or the first to k-th page buffers PB1 to PBk. In this case, during the program operation, an error may occur in data stored in the first to k-th page buffers PB1 to PBk through the data lines DL. For example, when there is a defect in the data lines DL, an error may occur when data is transmitted from the input/output circuit 160. Alternatively, when there is no defect in the data lines DL, but there is a defect in the first to k-th page buffers PB1 to PBk, an error may occur in the data stored in the first to k-th page buffers PB1 to PBk.

In the present embodiment, the defect generated in the data lines DL or the first to k-th page buffers PB1 to PBk may be detected by comparing data input to the first to k-th page buffers PB1 to PBk with data output from the first to k-th page buffers PB1 to PBk.

The defect detection may be performed at a time on the entire column of the first to k-th page buffers PB1 to PBk or may be performed in a unit of a chunk (CK).

A method of detecting a defect occurring in the data lines DL or the first to k-th page buffers PB1 to PBk will be specifically described as follows.

Figure 7:
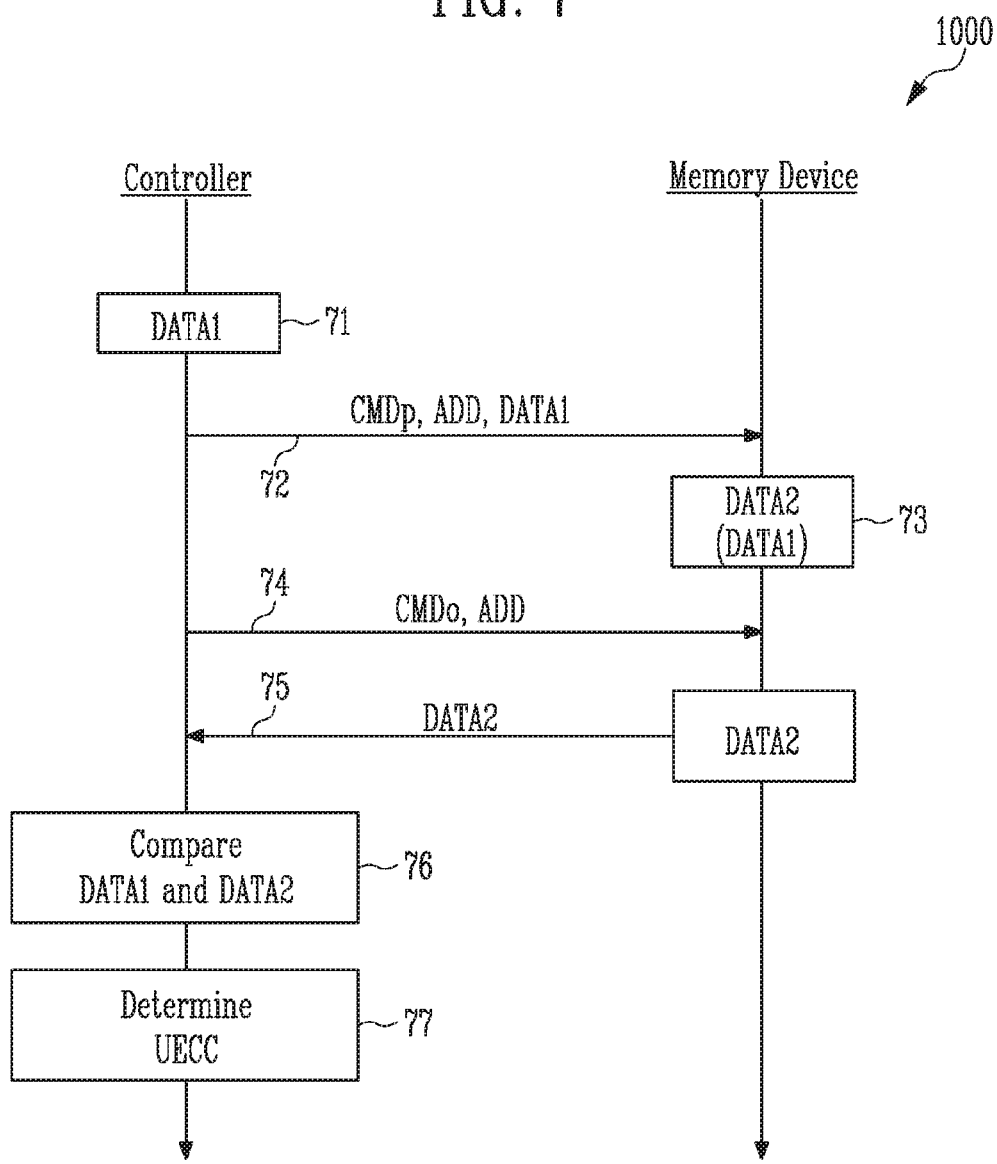
FIG. 7 is a diagram of a method of operating a memory system according to an embodiment of the present disclosure.

FIG. 7 is a diagram for describing a method of operating the memory system 1000 according to an embodiment of the present disclosure.

Referring to FIG. 7, the controller stores first data DATA1 in the buffer memory (71), and transmits a program command CMDp, an address ADD, and the first data DATA1 to the memory device (72). The program command CMDp may be a command for preparing the program operation, and the address ADD may include a row address and a column address. The row address and the column address may be addresses for regions where the first data DATA1 is to be programmed. For this purpose, the row address may include a memory block address, and the column address may include a chunk address. The first data DATA1 is original data for defect detection. The command and the addresses, or the command, the address, and the data, which transmitted from the controller to the memory device, may be the command set.

The memory device may store the first data received from the controller in the page buffer group (73). When the memory device stores the first data DATA1 (73), in a case where there is a defect in the data lines or the page buffer group inside the memory device, the first data DATA1 transmitted to the memory device may be stored as second data DATA2 having an error. That is, the second data DATA2 may be the same as or different from the first data DATA1 according to whether the data lines or the page buffer group are defective.

Because the program command CMDp is a command for preparing the program operation, the memory device may temporarily store the second data to only the page buffer group without programming the second data into the memory block.

The controller may transmit an output command CMDo and the address ADD to the memory device (74). The output command CMDo may be a command for outputting the data stored in the page buffer group of the memory device, and the address ADD may include the column address.

The memory device may output the second data DATA2 stored in the page buffer group to the controller according to the output command CMDo and the address ADD (75).

The data comparator 220 of FIG. 2 or 4 included in the controller may compare the first data, which is the original data stored in the buffer memory, with the second data DATA2 received from the memory device (76).

The controller may determine a pass or a fail of an uncorrectable error correction code (UECC) of the memory device according to the comparison result of the data comparator 220. For example, when it is determined that the first and second data DATA1 and DATA2 are identical to each other, the controller may determine that the UECC of the memory device as the pass, and when it is determined that the first and second data DATA1 and DATA2 are different from each other, the controller may determine that the UECC of the memory device as the fail and process a corresponding memory block as a bad device.

The command set transmitted from the controller to the memory device in steps 72 and 74 of FIG. 7 will be specifically described as follows.

Figure 8B:
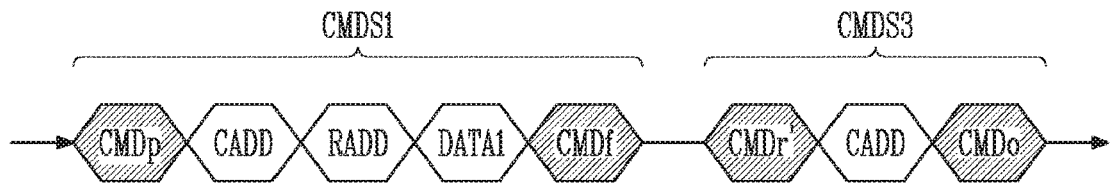

FIGS. 8A and 8B are diagrams for describing the command set transmitted from the controller to the memory device.

Referring to FIG. 8A, during a detection operation, the controller may transmit a first command set CMDS1, which is for inputting the first data DATA1 to the memory device, to the memory device, and then receive a second command set CMDS2, which is for receiving the second data from the memory device, to the memory device.

The first command set CMDS1 may include the program command CMDp, the column address CADD, the row address RADD, the first data DATA1, and an end command CMDf.

Because the program command CMDp is a command for preparing the program operation, the memory device may prepare to receive the address and the data in response to the program command CMDp. The column address CADD may include a chunk address to which the first data DATA1 is input, and the row address RADD may include an address of the memory block included in the memory cell array. During a defect detection operation, because the first data DATA1 input to the memory device is not substantially programmed into the memory block, the controller may include the end command CMDf in the last of the first command set CMDS1 including the first data DATA1. Therefore, the memory device does not perform an additional operation according to the end command CMDf after inputting the first data DATA1 to the page buffers.

When all of the first command sets CMDS1 are transmitted to the memory device, the controller may transmit the second command set CMDS2 to the memory device after a constant time. Here, a time interval (constant time) between the first command set CMDS1 and the second command set CMDS2 may be a program time set according to an algorithm of the program command CMDp, and may be omitted according to an algorithm stored in the control logic 170 of FIG. 5 of the memory device.

The second command set CMDS2 may include a read command CMDr, the column address CADD, the row address RADD, the address separation command CMDv, the column address CADD, and the output command CMDo.

The read command CMDr may be a command for preparing a read operation. When the read command CMDr is a command used in a general read operation, the memory device may sequentially receive the column address CADD and the row address RADD which are subsequently input according to the read command CMDr. Because the row address RADD is not used in the defect detection operation, in order to selectively use only the column address CADD, the controller may transmit the address separation command CMDv to the memory device, and may transmit the column address CDD to the memory device again. The column address CADD and the row address RADD included in the second command set CMDS2 are the same as the column address CADD and the row address RADD included in the first command set CMDS1. The output command CMDo may be a command for outputting the data input to the page buffers corresponding to the selected column address CADD.

After the controller transmits the second command set CMDS2 to the memory device, the controller may detect the defect of the memory device by comparing the data output from the memory device with the original data.

Because the read command CMDr used in the second command set CMDS2 is the same command as the read command used in the general read operation, the controller transmits both of the column address CADD and the row address RADD to the memory device, and then transmits the address separation command CMDv and the column address CADD to the memory device again. Such a method uses the read command CMDr used in the general read operation is used as it is, and thus the method has advantages that a separate read command for the defect detection operation is not necessary and a descriptor of the control logic 170 of FIG. 5 of the memory device is not reset. However, an unnecessary time increase may occur during a defect operation. Therefore, a separate read command for the defect detection operation may be used, and specific embodiments related to this will be described as follows.

Referring to FIG. 8B, the controller may transmit the first command set CMDS1 to the memory device and then transmit a third command set CMDS3 to the memory device.

The third command set CMDS3 may be a command generated separately for the defect detection operation. For example, the third command set CMDS3 may include a read command CMDr, the column address CADD, and the output command CMDo. The read command CMDr' included in the third command set CMDS3 may be a command generated for the defect detection operation, not a command used for the general read operation. For example, when the memory device receives the read command CMDr, the memory device may be set to receive only the column address CADD and not receive the row address RADD. Therefore, because the column address CADD does not need to be selected again, the controller may transmit the column command CADD and then directly transmit the output command CMDo to the memory device, differently from the second command set CMDS2. As described above, when the third command set CMDS3 is used, a time required for the defect detection operation may be shortened.

During the detection operation, the controller may transmit the first command set CMDS1, which is for inputting the first data DATA1 to the memory device, to the memory device, and then receive the second command set CMDS2, which is for receiving the second data from the memory device, to the memory device.

Figure 9:
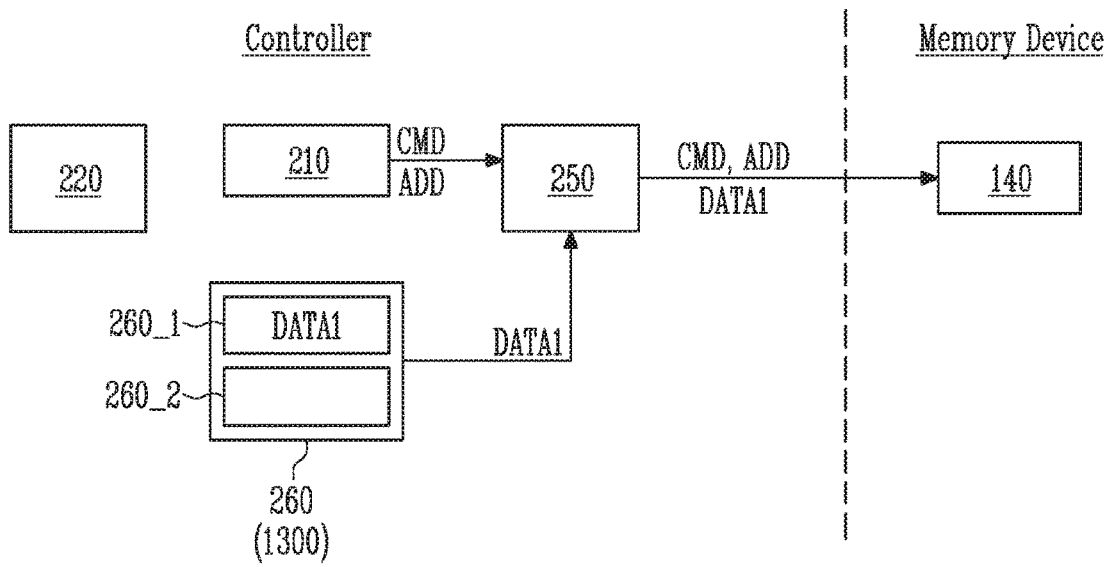
FIG. 9 is a diagram of a method in which the controller transmits a first command set to the memory device.

FIG. 9 is a diagram for describing a method in which the controller transmits the first command set to the memory device.

Referring to FIG. 9, for the defect detection operation of the memory device, the central processing unit 210 may generate the command CMD and the address ADD for inputting the first data DATA1 to the memory device, and may transmit the generated command CMD and address ADD to the memory interface 250. The command CMD may include the program command or the end command.

The buffer memory 260 may include a plurality of registers 260_1 and 260_2, and may transmit the first data DATA1 stored in the first register 260_1 to the memory interface 250 under the control of the central processing unit 210.

The memory interface 250 may configure the command CMD, the address ADD, and the first data DATA1 as one command set and transmit the one command set to the memory device.

Figure 10:
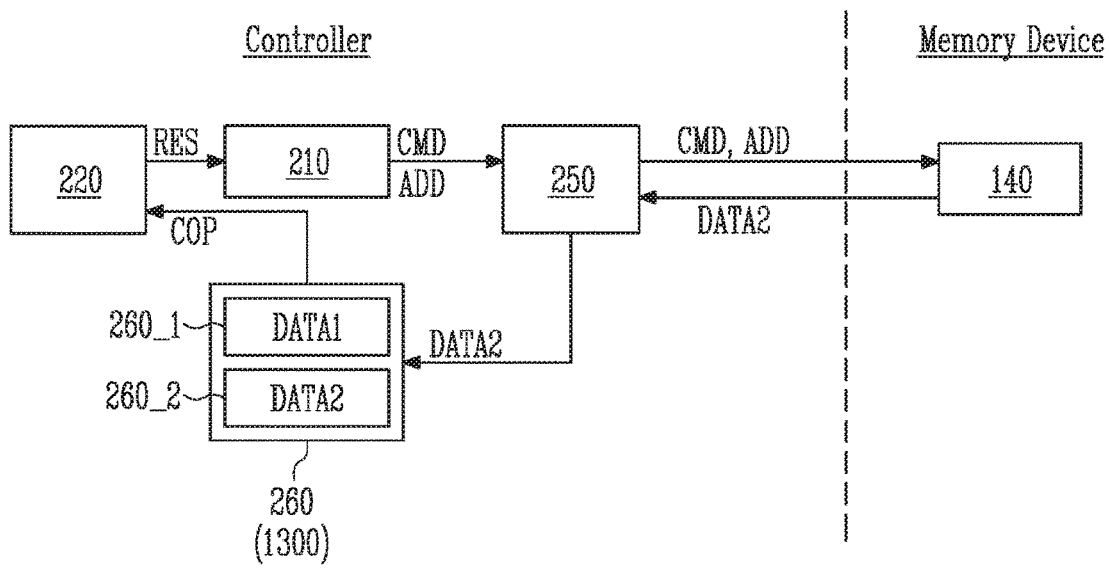
FIG. 10 is a diagram for describing a method of receiving second data from the memory device in response to a second or third command set and comparing first and second data with each other.

FIG. 10 is a diagram for describing a method of receiving the second data from the memory device in response to the second or third command set and comparing the first and second data with each other.

Referring to FIG. 10, the central processing unit 210 may generate the command CMD and the address ADD for receiving the second data DATA2 input to the memory device and transmit the generated command CMD and address ADD to the memory interface 250. When the second command set is used, the command CMD may include the read command, the address separation command, or the output command. When the third command set is used, the command CMD may include the read command or the output command.

The memory interface 250 may configure the command CMD and the address ADD received from the central processing unit 210 to one command set and transmit the one command set to the memory device.

The memory device may output the second data DATA2 to the controller in response to the second or third command set. The second data DATA2 may be the same data as the first data DATA1 received from the memory device 250 and stored in the memory device in FIG. 9. When there is a defect in a portion where the data is transmitted in the memory device, the second data DATA2 may be different from the first data DATA1.

The memory interface 250 may receive the second data DATA2 from the memory device and transmit the received second data DATA2 to the buffer memory 260 or 1300.

The buffer memory 260 or 1300 may store the second data DATA2 in the second register 260_2, and may output a comparison value COP obtained by comparing bits of the first data DATA1 and the second data DATA2 with each other one to one, under control of the data comparator 220.

The data comparator 220 may perform a comparison operation of comparing the first data DATA1 and the second data DATA2 with each other, which are stored in the first register 260_1 and the second register 260_2, respectively. For example, the data comparator 220 may output a result value according to the comparison value COP. For example, it is assumed that each of the first and second data DATA1 and DATA2 is formed of N bits, the comparison value COP may also be formed of N bits. When all of the comparison values COP of N bits are the same logical value (0 or 1), the data comparator 220 may determine that the second data DATA2 is the same as the first data DATA1, and may output a result signal RES indicating that there is no defect. Alternatively, when different logic values are detected among the comparison values COP of N bits, the data comparator 220 may determine that there is a defect in the memory device and may output a result signal RES indicating that there is the defect. For example, when the data comparator 200 is set so that the result signal RES indicating that there is no defect is output as high, the data comparator 200 may be set so that the result signal RES indicating that there is a defect is output as low.

The central processing unit 210 may determine whether the memory device is defective according to the result signal RES, and perform a subsequent operation according to a determination result. For example, when the central processing unit 210 receives the result signal RES indicating that there is no defect, the central processing unit 210 may perform a subsequent operation so that the memory device may perform a normal operation. When the central processing unit 210 receives the result signal RES indicating that there is a defect, the central processing unit 210 may process a corresponding memory device as a bad device.

The above-described defect detection operation may be performed in a normal program operation or garbage collection, and may also be performed in a test operation of the memory device. The normal program operation and the garbage collection will be described as examples, respectively, as follows.

Figure 11:
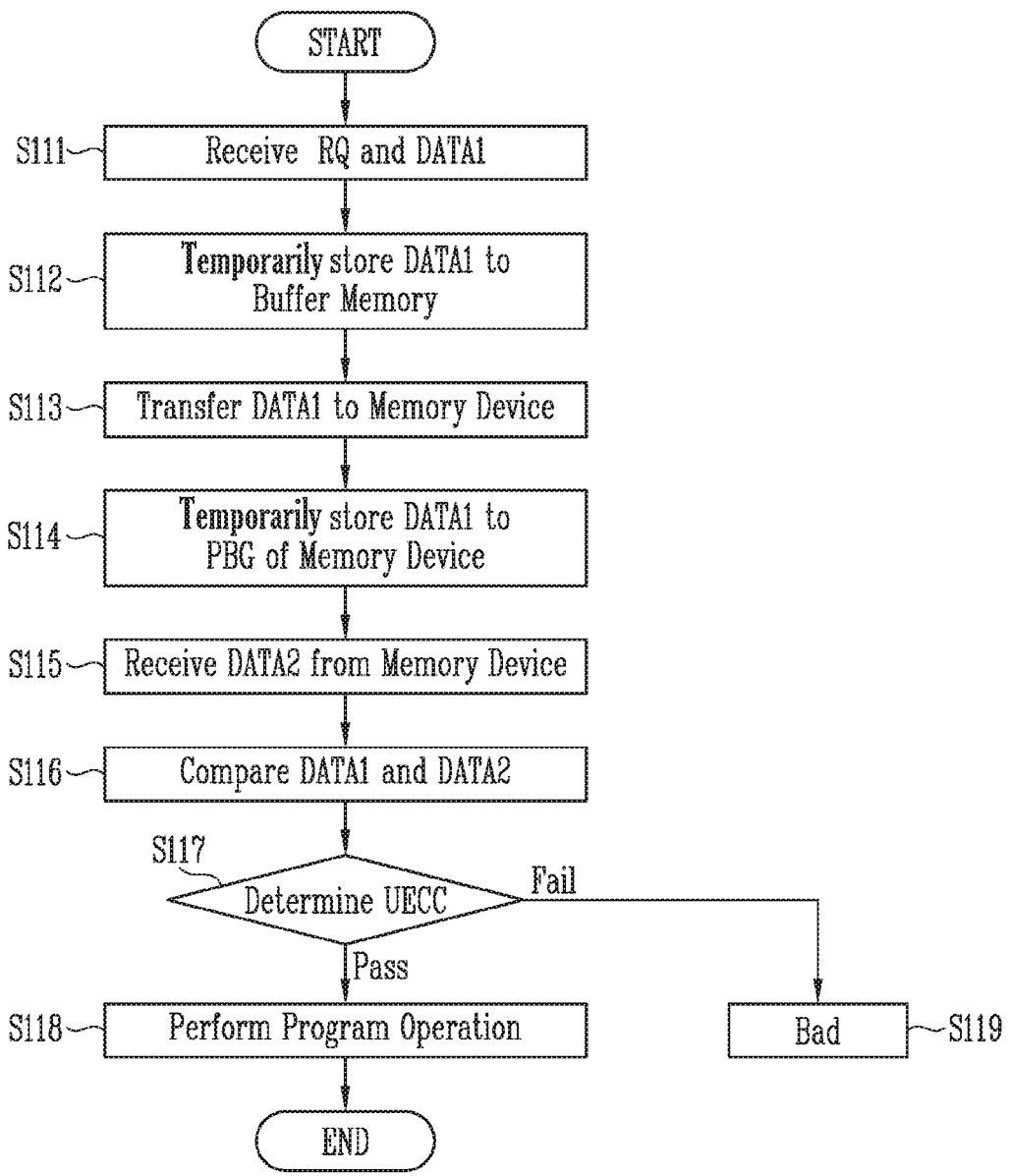
FIG. 11 is a diagram of a method of performing a defect detection operation of the memory device in a normal program operation.

FIG. 11 is a diagram for describing a method of performing the defect detection operation of the memory device in the normal program operation.

Referring to FIG. 11, when the controller receives the program request RQ together with the first data DATA1 from the host (S111), the controller may temporarily store the first data DATA1 in the buffer memory (S112). The first data DATA1 may be the original data and may be temporarily stored in the first register of the buffer memory.

The controller may transmit the first data DATA1 to the memory device (S113). For example, the controller may transmit the first command set including the program command, the column address, the row address, the first data DATA1, and the end command to the memory device.

The memory device may temporarily store the first data in the page buffer group (S114). The first data DATA1 stored in the memory device may be the second data DATA2. That is, the second data DATA2 refers to the first data DATA1 stored in the page buffer group.

The controller receives the second data from the memory device (S115). For example, the controller may transmit the second command set including the read command, the column address, the row address, the address separation command, the column address, and the output command to the memory device. Alternatively, the controller may transmit the third command set including the read command, the column address, and the output command to the memory device. The memory device may output the second data DATA2 stored in the page buffer group to the controller in response to the second or third command set. The controller may store the second data received from the memory device in the second register of the buffer memory.

The controller may compare the first and second data DATA1 and DATA2 stored in the buffer memory with each other (S116), and may determine the pass or the fail of the uncorrectable error correction code (UECC) of the memory device according to the comparison result (S117). For example, when it is determined that the first and second data DATA1 and DATA2 are identical to each other, the controller may determine the UECC of the memory device as the pass, and when it is determined that the first and second data DATA1 and DATA2 are different from each other, the controller may determine the UECC of the memory device as the fail.

When the uncorrectable error correction code is determined as the pass in step S117, the controller may perform a subsequent program operation (S118). For example, because the first data DATA1 which is the original data is stored in the page buffer group of the memory device, the controller may transmit a command for starting the program operation to the memory device, and the memory device may perform the program operation using the first data DATA1 stored in the page buffer group in step S114.

When the uncorrectable error correction code is determined as the fail in step S117, the controller may process the memory device as the bad device (S119). For example, the controller may store an address of a memory device in which an error is detected, and block access to the bad processed memory device. When the uncorrectable error correction code is determined as the fail in the memory device in which the uncorrectable error correction code is determined as the pass in step S117, because a progressive error occurs in the memory device, a corresponding memory device may be processed as bad.

When a plurality of memory devices are included in the memory system, the controller may replace an address of the bad processed memory device with an address of another memory device. When only one memory device is included in the memory system, the controller may output information or a signal indicating that the memory device is in a bad state to the host.

Figure 12:
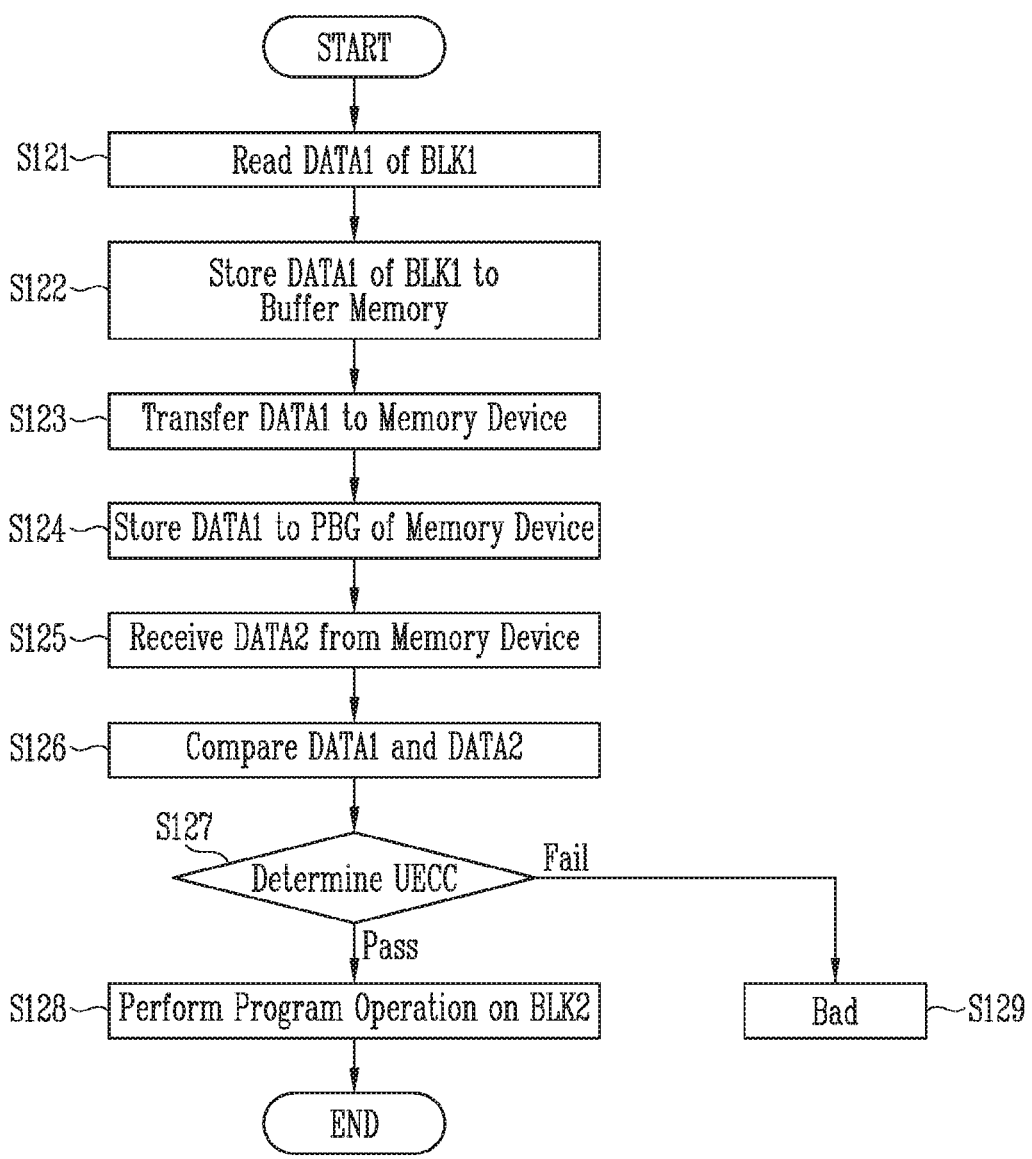
FIG. 12 is a diagram of a method of performing the defect detection operation of the memory device in garbage collection.

FIG. 12 is a diagram for describing a method of performing the defect detection operation of the memory device in the garbage collection.

Referring to FIG. 12, the garbage collection refers to a technique of ensuring the number of free blocks by copying back data of pages where valid data is stored among blocks where data is stored to a selected memory block and erasing the memory block where all valid data are copied back, when the number of free blocks among the memory blocks included in the memory device is less than a reference number. FIG. 12 shows a method of detecting a defect of a memory device including first and second memory blocks BLK1 and BLK2 in a garbage collection in which valid data of the first memory block BLK1 is copied back to the second memory block BLK2.

The controller may read the first data DATA1 from the first memory block BLK1 of the memory device (S121). When the controller receives the read first data DATA1, the controller may store the first data DATA1 in the buffer memory (S122). The first data DATA1 may be the original data read from the first memory block BLK1 and may be temporarily stored in the first register of the buffer memory.

The controller may transmit the first data DATA1 to the memory device (S123). For example, the controller may transmit the first command set including the program command, the column address, the row address, the first data DATA1, and the end command to the memory device. The row address included in the first command set may include an address of the second memory block BLK2.

The memory device may store the first data DATA1 in the page buffer group PBG (S124). The first data DATA1 stored in the memory device may be the second data DATA2. That is, the second data DATA2 refers to the first data DATA1 stored in the page buffer group PBG.

The controller receives the second data from the memory device (S125). For example, the controller may transmit the second command set including the read command, the column address, the row address, the address separation command, the column address, and the output command to the memory device. Alternatively, the controller may transmit the third command set including the read command, the column address, and the output command to the memory device. The memory device may output the second data DATA2 stored in the page buffer group to the controller in response to the second or third command set. The controller may store the second data DATA2 received from the memory device in the second register of the buffer memory.

The controller may compare the first and second data DATA1 and DATA2 stored in the buffer memory with each other (S126), and may determine the uncorrectable error correction code (UECC) of the memory device as the pass or the fail according to the comparison result (S127). For example, when it is determined that the first and second data DATA1 and DATA2 are identical to each other, the controller may determine the UECC of the memory device as the pass, and when it is determined that the first and second data DATA1 and DATA2 are different from each other, the controller may determine the UECC of the memory device as the fail.

When the uncorrectable error correction code is determined as the pass in step S127, the controller may perform a program operation of the second memory block BLK2 (S128). For example, because the first data DATA1 which is the original data is stored in the page buffer group of the memory device, the controller may transmit the command for starting the program operation to the memory device, and the memory device may perform the program operation using the first data DATA1 stored in the page buffer group in step S124.

When the uncorrectable error correction code is determined as the fail in step S127, the controller may process the memory device as the bad device (S129). For example, the controller may store an address of a memory device in which an error is detected, and block access to the bad processed memory device. When a plurality of memory devices are included in the memory system, the controller may replace an address of the bad processed memory device with an address of another memory device. When only one memory device is included in the memory system, the controller may output information or a signal indicating that the memory device is in a bad state to the host.

Figure 13:
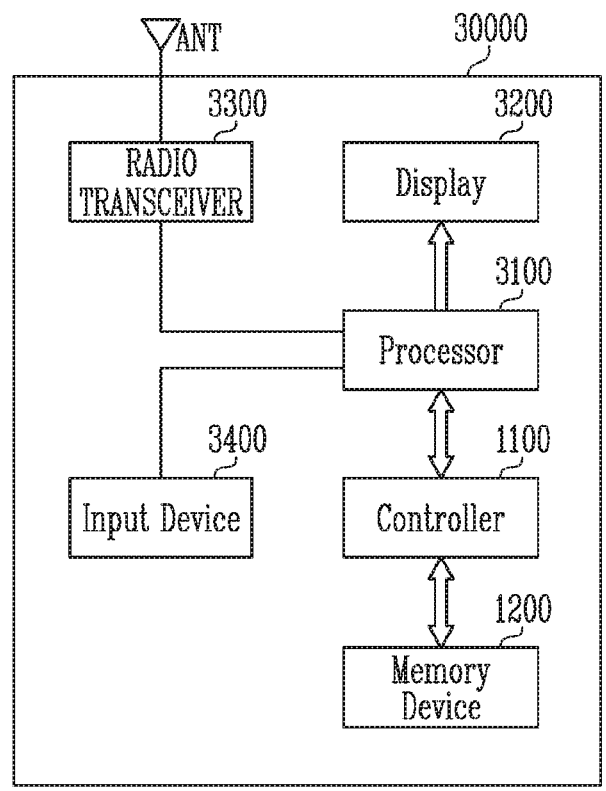
FIG. 13 is a diagram of another embodiment of the memory system including the controller according to an embodiment of the present disclosure.

FIG. 13 is a diagram for describing another embodiment of a memory system 30000 including the controller according to an embodiment of the present disclosure.

Referring to FIG. 13, the memory system 30000 may be implemented as a cellular phone, a smart phone, a tablet, a PC, a personal digital assistant (PDA), or a wireless communication device. The memory system 30000 may include the memory device 1200 and the controller 1100 capable of controlling the operation of the memory device 1200. The controller 1100 may control a data access operation, for example, a program operation, an erase operation, a read operation, or the like, of the memory device 1200 under control of a processor 3100.

Data programmed in the memory device 1200 may be output through a display 3200 under the control of the controller 1100.

In order to detect a defect in the memory device 1200, after storing the original data and transmitting the original data to the memory device 1200, the controller 1100 may receive the transmitted data again and compare the original data with the received data to determine whether the memory device 1200 is defective.

A radio transceiver 3300 may transmit and receive a radio signal through an antenna ANT. For example, the radio transceiver 3300 may convert a radio signal received through the antenna ANT into a signal that may be processed by the processor 3100. Therefore, the processor 3100 may process the signal output from the radio transceiver 3300 and transmit the processed signal to the controller 1100 or the display 3200. The controller 1100 may transmit the signal processed by the processor 3100 to the memory device 1200. In addition, the radio transceiver 3300 may convert a signal output from the processor 3100 into a radio signal, and output the converted radio signal to an external device through the antenna ANT. An input device 3400 may be a device capable of inputting a control signal for controlling the operation of the processor 3100 or data to be processed by the processor 3100. The input device 3400 may be implemented as a pointing device such as a touch pad or a computer mouse, a keypad, or a keyboard. The processor 3100 may control an operation of the display 3200 so that data output from the controller 1100, data output from the radio transceiver 3300, or data output from the input device 3400 is output through the display 3200.

According to an embodiment, the controller 1100 capable of controlling the operation of memory device 1200 may be implemented as a part of the processor 3100 and may be implemented as a chip separate from the processor 3100.

Figure 14:
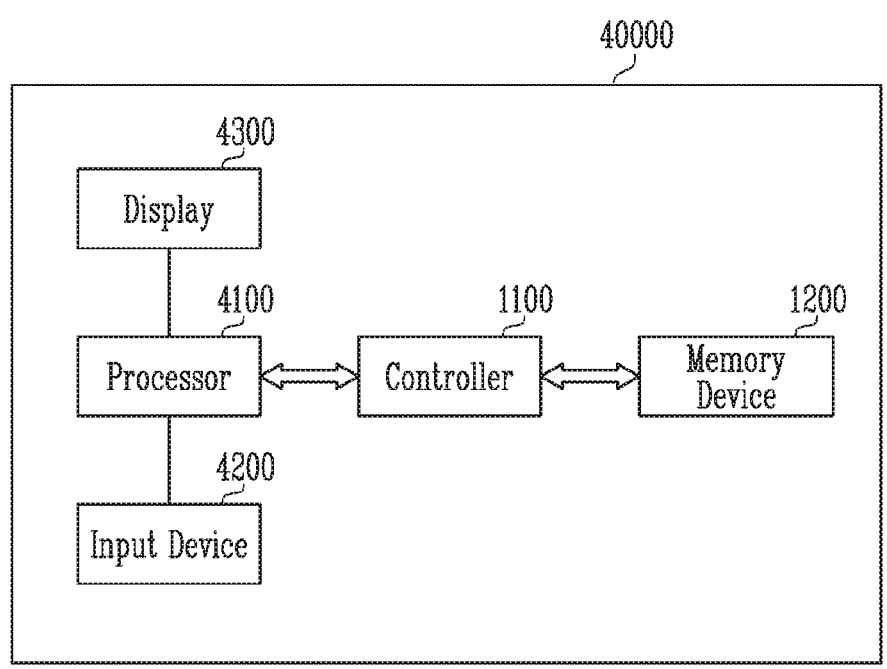
FIG. 14 is a diagram of another embodiment of the memory system including the controller according to an embodiment of the present disclosure.

FIG. 14 is a diagram for describing another embodiment of a memory system 40000 including the controller according to an embodiment of the present disclosure.

Referring to FIG. 14, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include the memory device 1200 in which data is stored, and the controller 1100 capable of controlling a data process operation of the memory device 1200.

A processor 4100 may output data stored in the memory device 1200 through a display 4300, according to data input through an input device 4200. For example, the input device 4200 may be implemented as a point device such as a touch pad or a computer mouse, a keypad, or a keyboard.

The processor 4100 may control the overall operation of the memory system 40000 and control the operation of the controller 1100. According to an embodiment, the controller 1100 capable of controlling the operation of memory device 1200 may be implemented as a part of the processor 4100 or may be implemented as a chip separate from the processor 4100.

In order to detect a defect in the memory device 1200, after storing the original data and transmitting the original data to the memory device 1200, the controller 1100 may receive the transmitted data again and compare the original data with the received data to determine whether the memory device 1200 is defective.

Figure 15:
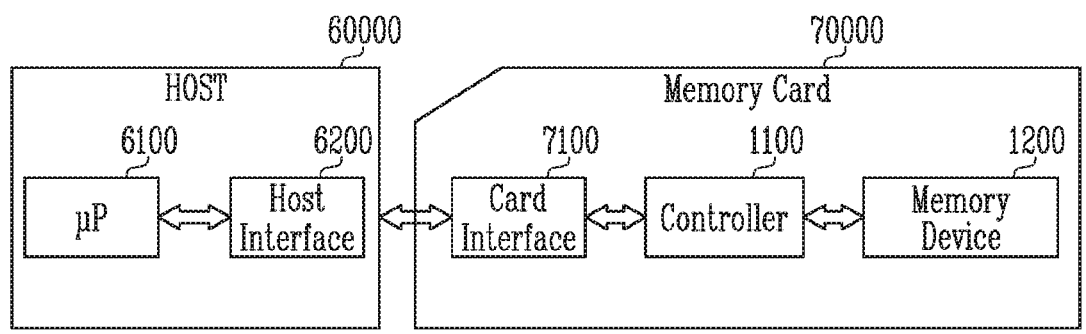
FIG. 15 is a diagram of another embodiment of the memory system including the controller according to an embodiment of the present disclosure.

FIG. 15 is a diagram for describing another embodiment of a memory system 70000 including the controller according to an embodiment of the present disclosure.

Referring to FIG. 15, the memory system 70000 may be implemented as a memory card or a smart card. The memory system 70000 may include the memory device 1200, the controller 1100, and a card interface 7100.

The controller 1100 may control data exchange between the memory device 1200 and the card interface 7100. According to an embodiment, the card interface 7100 may be a secure digital (SD) card interface or a multi-media card (MMC) interface, but is not limited thereto.

In order to detect a defect in the memory device 1200, after storing the original data and transmitting the original data to the memory device 1200, the controller 1100 may receive the transmitted data again and compare the original data with the received data to determine whether the memory device 1200 is defective.

The card interface 7100 may interface data exchange between a host 60000 and the controller 1100 according to a protocol of the host 60000. According to an embodiment, the card interface 7100 may support a universal serial bus (USB) protocol, and an interchip (IC)-USB protocol. Here, the card interface 7100 may refer to hardware capable of supporting a protocol that is used by the host 60000, software installed in the hardware, or a signal transmission method.

When the memory system 70000 is connected to a host interface 6200 of the host 60000 such as a PC, a tablet PC, a digital camera, a digital audio player, a mobile phone, a console video game hardware, or a digital set-top box, the interface 6200 may perform data communication with the memory device 1200 through the card interface 7100 and the controller 1100 under control of a microprocessor (pp) 6100.

What is claimed is:

1. A controller comprising:
   a buffer memory configured to store original data;
   a central processing unit configured to generate a first command for storing the original data in a page buffer group of a memory device, generate a second command for receiving test data stored in the page buffer group according to the first command from the memory device, and store the test data received from the memory device in the buffer memory; and
   a data comparator configured to compare the test data stored in the buffer memory with the original data,
   wherein the central processing unit is further configured to determine whether the memory device is defective according to a comparison result of the data comparator.

2. The controller of claim 1, wherein the buffer memory comprises:
   a first register configured to store the original data; and
   a second register configured to store the test data received from the memory device.

3. The controller of claim 1, wherein the central processing unit is configured to generate and output:
a program command for inputting first data to the page buffer group of the memory device;
an end command for preventing the first data from being programmed into the memory device;
a read command for reading the test data stored in the page buffer group from the memory device;
an address separation command for distinguishing an address to which the test data is input from the memory device; and
an output command for outputting the test data read from the memory device.

4. The controller of claim 1, wherein the buffer memory is configured to output comparison values obtained by performing one-to-one comparisons of bits of the test data and the original data with each other under control of the data comparator.

5. The controller of claim 4, wherein the data comparator is configured to:
output a first result signal when all of the comparison values are same logic values; and
output a second result signal when there are different logic values among the comparison values.

6. The controller of claim 5, wherein the central processing unit is configured to output commands to:
perform a program operation in the memory device when the central processing unit receives the first result signal; and
process the memory device as a bad device when the central processing unit receives the second result signal.

7. A memory system comprising:
a memory device including a plurality of page buffers that store data; and
a controller configured to:
store first data in target page buffers of the memory device;
receive second data stored in the target page buffers among the plurality of page buffers; and
detect a defect of the memory device according to a result of comparing the second data received from the memory device with the first data.

8. The memory system of claim 7, wherein the controller is configured to:
output a first command set so that the first data is stored in the target page buffers of the memory device; and
output a second command set to receive the second data from the target page buffers to which the first data is input.

9. The memory system of claim 8, wherein the first command set comprises:
a program command;
a column address;
a row address;
the first data; and
an end command.

10. The memory system of claim 9, wherein the program command is a command to cause the first data to be input to the target page buffers.

11. The memory system of claim 9, wherein the column address and the row address are addresses for a region into which the first data is to be programmed.

12. The memory system of claim 9, wherein the end command is a command for preventing the first data from being programmed into a memory block of the memory device.

13. The memory system of claim 8, wherein the second command set comprises:
a read command;
a column address;
a row address;
an address separation command; and
an output command.

14. The memory system of claim 13, wherein the read command is a command for reading the second data input to the target page buffers.

15. The memory system of claim 13, wherein the address separation command is a command for selecting the column address among the column address and the row address input to the memory device together with the read command.

16. The memory system of claim 13, wherein the output command is a command for outputting the second data, which is input to the target page buffers, to the controller.

17. A method of operating a controller, the method comprising:
storing first data in a first register;
inputting the first data to a page buffer group of a memory device;
receiving second data stored in the page buffer group to which the first data is input from the memory device;
storing the second data in a second register;
comparing the first and second data, which are stored in the first and second registers, respectively, with each other; and
detecting a defect of the memory device according to a result of a comparison of the first and second data.

18. The method of claim 17, wherein inputting the first data to the page buffer group of the memory device comprises transmitting to the memory device:
a program command for inputting the first data to the page buffer group of the memory device; and
an end command for preventing the first data from being programmed into a memory block of the memory device.

19. The method of claim 17, wherein detecting the defect of the memory device comprises:
performing a program operation of the memory device when all comparison values obtained by one-to-one comparisons of bits of the first and second data with each other are same logical values; and
processing the memory device as a bad device when comparison values include at least one different logical value.

* * * * *